United States Patent [19]

Soóki-Tóth et al.

[11] Patent Number: 4,572,793
[45] Date of Patent: Feb. 25, 1986

[54] METHOD FOR THE PRODUCTION OF POSITIVE ACTIVE MATERIAL FOR LEAD STORAGE BATTERIES

[75] Inventors: Gábor Soóki-Tóth; Pál Horváth; Pálné Jedlovszky; József Keszler; László Sors, all of Budapest, Hungary

[73] Assignee: Villamosipari Kutato Intezet, Budapest, Hungary

[21] Appl. No.: 576,395

[22] PCT Filed: Jun. 2, 1983

[86] PCT No.: PCT/HU83/00029
§ 371 Date: Jan. 4, 1984
§ 102(e) Date: Jan. 4, 1984

[87] PCT Pub. No.: WO83/04345
PCT Pub. Date: Dec. 8, 1983

[30] Foreign Application Priority Data
Jun. 2, 1982 [HU] Hungary .............................. 1770/82

[51] Int. Cl.[4] .............................................. C08L 27/18
[52] U.S. Cl. .................................. 252/182.1; 429/217; 429/228
[58] Field of Search .................... 252/182.1; 429/217, 429/27, 215, 218, 225, 228

[56] References Cited

U.S. PATENT DOCUMENTS

| | | | |
|---|---|---|---|
| 3,898,099 | 8/1975 | Baker et al. | 252/182.1 |
| 4,062,750 | 12/1977 | Butter | 204/290 F |
| 4,090,978 | 5/1978 | Welsh et al. | 502/101 |
| 4,177,157 | 12/1979 | Adams | 252/182.1 |
| 4,177,159 | 12/1979 | Singer | 252/182.1 |
| 4,315,829 | 2/1982 | Duddy et al. | 252/182.1 |

FOREIGN PATENT DOCUMENTS

458302 10/1913 France .
271600 5/1970 U.S.S.R. .

OTHER PUBLICATIONS

"The Manufacture of Electrical Batteries", Dasoyan et al., 3rd Edition, USSR, Professional Technical Education.
"Vysshaja Shkola", *Proizvodstvo Elektricheskikh Akkumuliatorov*, (Moscow), Dasojan, p. 179, 1973.

*Primary Examiner*—Thomas Wallen
*Attorney, Agent, or Firm*—Handal & Morofsky

[57] ABSTRACT

The object of the invention is a method for the production of positive active material for lead storage batteries. This active material consists of PbO and $PbO_x$—where x is a number between 1 and 2—and some powder being composed of not more than 30 to 35% lead in optional ratio and some water. The basis of the invention is mixing glycerine and polytetrafluorethylene, as addition, to the active material.

5 Claims, 1 Drawing Figure

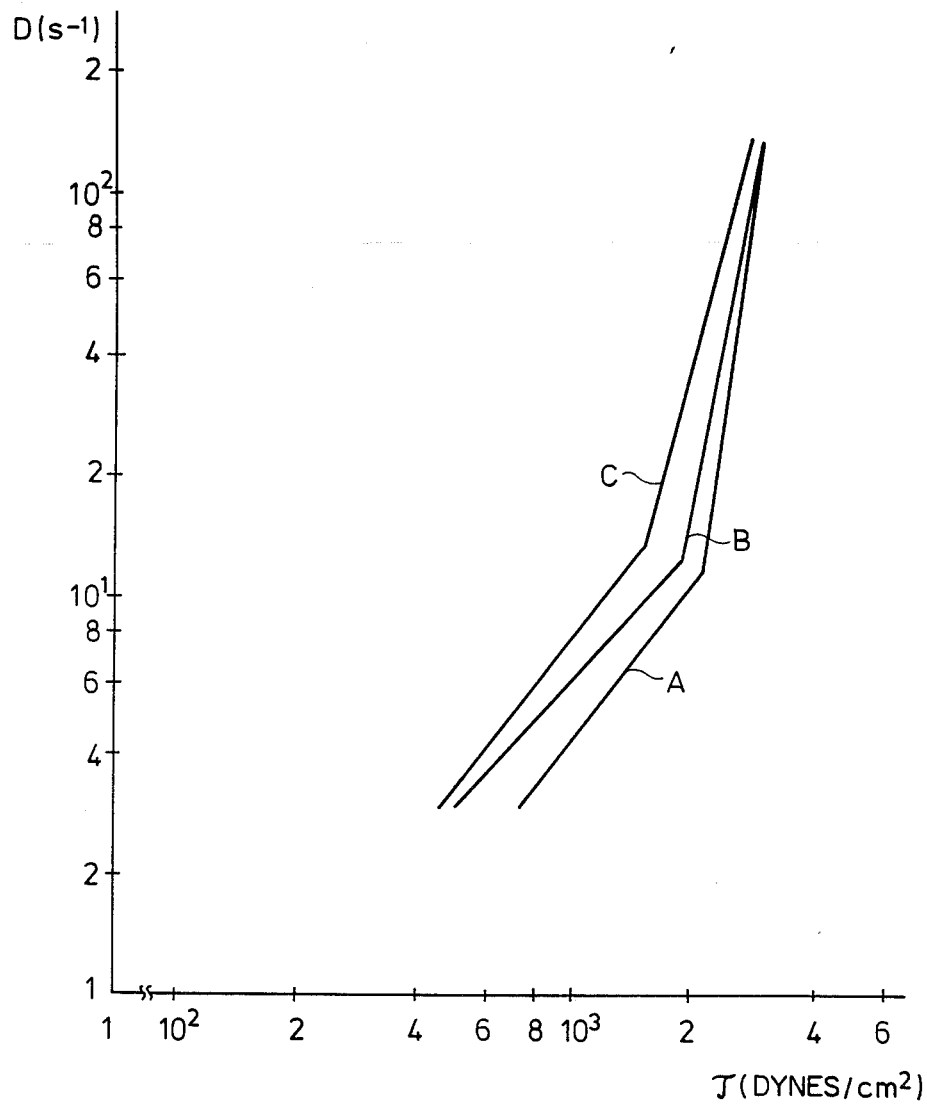

METHOD FOR THE PRODUCTION OF POSITIVE ACTIVE MATERIAL FOR LEAD STORAGE BATTERIES

TECHNICAL FIELD

The present invention concerns a method for the production of positive active material for lead storage batteries, this active material consists of PbO and $PbO_x$—where x is a number between 1 and 2—and some powder being composed of not more than 30–35% lead in optional ratio and some water.

BACKGROUND ART

In some cases—e.g. for vehicles or for emergency supply sources—the positive electrodes of lead-acid storage batteries are so called tubular plates, also known as tube type battery plates. In this case, the active material, surrounding the conducting lead rod, is covered with acid-resisting textile material so that the active material will not fall down from the conductor. The tubular plates are conventionally made by pulling the current collecting rods, which are connected to the current distributing bridge into the tube sheath, made from textile, and the dry mixture, composed of oxidized lead-powder and auxiliaries, is filled into the space between the rod and the sheath with vibration. This process is very dangerous because of the dusting of the lead-oxide powder and there isn't any perfect protection in spite of the great costs. In order to eliminate this problem, the so called wet filling method was developed. The known procedures are concerned first of all with the new results of developing the filling apparatus as described in the German Pat. No. 2 936 025 or U.S. Pat. No. 3,228,796. In the U.S. Pat. No. 4,037,630 the application of wet active material and a filling apparatus is described. The active material is a mixture of water and lead-oxide and its homogeneity is ensured by permanent mixing. This method has the disadvantage that the lead-oxide powder settles down in the water because of its 9 g/cc density, so this active material isn't practically homogeneous; it doesn't keep its consistence. In British Pat. No. 1 488 953 a complicated and expensive apparatus solves the problem of the processability of unstable material with continuous circulation and special stream system. The other disadvantage of the unstable consistence is that the part of the mixture that is rich in water will escape through the porous wall of the textile sheets; therefore this textile material must meet very strict requirements.

In British Pat. No. 1 475 490 the discharge of this mixture through the pores of the textile tubes is prevented by mixing sulfuric acid, water and sulfuric acid-resiting fibrous material to the active material in addition to lead oxides. The active material is extruded into the porous textile tubes under pressure and then due to the pressure, the liquid part of the pulp, moving through the pores of tubes, will carry the particles of the fibrous material to the internal wall of the tube.

In this way the coating on the internal wall of the tubes formed from the fibrous material will operate as a filter and lets only the liquid-phase of the active material flowing out through the wall of the textile tubes.

This method has the disadvantage that the structure of the active material will be non-homogeneous along the cross-section of the tubes because of the decrease of the fibrous material along the axis of the tubes.

In order to eliminate the dangerous dusting during the filling process—as described in the U.S. Pat. No. 4,252,872—two percent of polytetrafluorethylene (PTFE) is added to the oxidized lead powder either as a dry powder or in suspension. Then the mixture is heated. Thereby the PTFE changes from a powder to fibres. This fibrous PTFE will convert the 1–20 $\mu$m particles of the lead oxide powder into granules having the dimensions 100–250 $\mu$m, so the dusting will decrease.

The application of PTFE is described in the U.S. Pat. No. 4,110,519, first of all for the production of lubricated electrodes for storage batteries. In this case the active material is set into the windows of the conducting grid by lubrication and the finished electrode isn't covered with a textile-like material. By this type of electrode the connection between the active material and the conductor is very important; if the bond between them isn't strong enough, the active material will fall out of the grid during the operation. According to this patent an adhesive and coherent active material is available by mixing 0.1 to 3% weight percent PTFE with dry lead-oxide powder at the temperature of 80° C. and possibly with $MgSO_4$ inaddition. After mixing the dry powder, water or water and sulfuric acid is added and the mixing goes on. The stability of the mixture—that is the period while the active material keeps the viscosity adjusted in the mixer—isn't described. According to our observations, this type of active material has to be processed in a few hours and some laintance could happen even in this case.

Some decades ago glycerine was used for the production of lubricated electrodes to get a cement-like hardening active material. This application is described—among others—in the book C. Drucker and Dr. A. Finkelstein: Galvanische Elemente and Akkumulatoren (Akademisohe Verlag GmbH, Lepzig, 1932).

Nowadays glycerine isn't used, probably because of water evolution during the formation of the lead-glycerate. This water, formed during the drying after the lubrication, increases the inclination of the active material to crack and, so decreases the lifetime of the lubricated electrode.

DISCLOSURE OF INVENTION

It is the object of this invention to provide a method for the production of active material—primarily for manufacturing tubular type positive electrodes—which is suitable to wet filling because of its advantageous properties. It keeps the viscosity for a long time without any change; no fractionation takes place among the component having different specific gravity; it has a water-absorbing capacity, so the porosity of the finished electrode can be changed in a wide range; and the electrical properties of storage batteries having this type of positive electorde are the same or better than the storage batteries made from known active materials.

The basis of this invention is the discovery that adding some glyerine—as principal component—PTFE and water—as ingredients—to the oxidized lead powders and mixing them intensively, a mass is obtained that keeps its viscosity for a long time (for some weeks) without any change; fractionating doesn't take place either during storage or during processing and the water-absorbing capacity can be changed controllably by the composition of the ingredients.

We have discovered that these advantageous properties derive from the synergistic effect of the aqueous solution of the glycerine and PTFE.

We have achieved our aim by the described method according to the invention by adding some glycerine and PTFE to the active material and mixing them.

The active material manufactured according to the invention is suitable for the production of positive plates of the tubular type storage batteries, which are covered with textile or textile-like material, by wet filling because of its advantageous property that the active material can be set into the tubes of the electrodes without pressure, in homogeneous structure. The porosity and the structure will be homogeneous along the length and the cross-section of the electrode. Another advantage of the active material according to the invention is that it does not need strict specifications for the quality of the covering textile-like material because the stable viscosity can be changed and if the value of the viscosity is proper, the material will not flow out through the pores of the textile. Accordingly the waste of material is minimized.

According to a preferred embodiment of the invention the addition is an aqueous solution containing 2.5 to 12.5 weight percent glycerine, 0.005 to 1 weight percent PTFE and 15 to 50 weight percent water.

According to another, preferred embodiment, the quantity of the addition is 200 to 600 cm$^3$ for 1 kg of active material.

According to the invention the oxidized lead-powder and the addition must be mixed for 2 to 8 hours, preferably for 4 to 5 hours, in an apparatus that mixes the materials intensively; this apparatus is preferably a double Z-arm blender.

According to another preferred embodiment the mixing is done at higher temperature, preferably at 45° to 60° C. If the structure of the active material is the same as at 20° C., the mixing time is only the half of it at 50° C. At any temperature the mixing can be finished when the viscosity of the active material becomes constant. The material will keep this viscosity without any change for some weeks.

According to the invention the addition must be mixed to the mixture of the oxidized lead-powders during the first fifth to fourth of the mixing time with a continuous slow stream. The feeding is done preferably with dropping.

The invention will be described in detail by way of examples with reference to the accompanying drawing.

BRIEF DESCRIPTION OF DRAWINGS

The FIGURE shows the viscosity characteristic of the active material in the diagram. The tangential shear stress is on the horizontal axis; the velocity gradient is on the vertical axis.

MODES FOR CARRYING OUT THE INVENTION

Example 1

A homogeneous mixture of 800 g lead-oxide powder (72 weight percent PbO) and 1200 g minimum is set into a double Z-arm blender; the mixing and the feeding of the addition is then started. 553 cm$^3$ addition (containing 5.19 weight percent glycerine, 0.038 weight percent PTFE and 23.6 weight percent water) is fed with a slow stream so that the full quantity would get into the blender in one hour. The material is then mixed for 4 hours. The finished active material is then filled into the tubes containing conducting rods. The inlet opening of the tubes are then closed and the electrode is sulfated for 30 minutes in 1.15 g/cm$^3$ density aqueous sulfuric acid. Then the electrodes will be dried in 40° C. air blow and will be electrically measured.

Example 2

The procedure of Example 1 is followed, except that 0.5 weight percent fine grained iron-free siliceous earth is mixed with the material and the quantity of the addition is 620 cm$^3$ containing 5.19 weight percent glycerine, 0.038 weight percent PTFE and 26.9 weight percent water.

Example 3

The procedure of Example 1 is followed except that the quantity of the addition is 553 cm$^3$ containing 5.19 weight percent glycerine and 24.8 weight percent water.

Example 4

The procedure of Example 1 is followed except that the quantity of the addition is 450 cm$^3$ containing 0.38 weight percent PTFE and 22.3 weight percent water.

Example 5

The procedure of Example 1 is followed except that the dry powder mixture is 2000 g lead-oxide (72 weight percent PbO) and the quantity of the addition is 545 cm$^3$ containing 5.19 weight percent glycerine, 0.038 weight percent PTFE and 23.2 weight percent water.

Example 6

The procedure of Example 1 is followed except that the quantity of the addition is 916 cm$^3$ containing 8.02 weight percent glycerine, 0.038 weight percent PTFE and 39.28 weight percent water.

Example 7

The procedure of Example 1 is followed except that the quantity of the addition is 700 cm$^3$ containing 5.19 weight percent glycerine, 0.38 weight percent PTFE and 30.8 weight percent water.

Example 8

A homogeneous mixture of 800 g lead-oxide powder (72 weight percent PbO) and 1200 g minium is filled into the tubes containing conducting rods on a shaking table. Then the procedure of Example 1 is followed.

Example 9

The procedure of Example 1 is followed except that the material is mixed for 2.5 hours at 50° C.

The FIGURE shows the viscosity characteristics of the active material made according to Example 7. Curve "A" shows the viscosity characteristics of the material immediately after mixing; curve "B" after 10 days; and curve "C" after 20 days.

The results of the experiments described in Examples 1 to 9 are shown in Tables 1 and 2 comparing them to each other.

Table 2 shows the electrical characteristics referring to the electrical characteristic of the electrode made by traditional dry filling as described in Example 8. In addition to the relative values, Table 2 gives the values of the capacity referring to unit of weight of the filled dry active material in Ah/g.

Capacity is the charge supplied by the storage battery in 1 hour when the loading current I=constant, while the end voltage of a cell isn't less than 1.7 V if the loading current I=0.2 $C_5A$, and not less than 1.5 V if the loading current I=$C_5A$.

$C_5$ is the nominal capacity of the storage battery referring to 5 hours discharge duration. So e.g. if $C_5$=260 Ah, the expression I=$C_5A$ means that the loading current I=260 A a, and I=0.2 $C_5A$ means that the loading current I=52 A.

TABLE 1

| | Composition of the addition | | | Characteristics of the active material | |
|---|---|---|---|---|---|
| | Glycerine (g/1 kg active material) | PTFE (g/1 kg active material) | Water (cm³/1 kg active material) | Gravimetric density (g/cm³) | Weight of the filled dry active material |
| Example 1 | 51.9 | 0.38 | 236 | 3.35 | 791.4 |
| Example 2 | 51.9 | 0.38 | 269 | 3.22 | 733.2 |
| Example 3 | 51.9 | — | 248 | 3.34 | 764.4 |
| Example 4 | — | 3.8 | 223 | 3.85 | 850.2 |
| Example 5 | 51.9 | 0.38 | 232 | 3.37 | 778.5 |
| Example 6 | 80.2 | 0.38 | 393 | 2.85 | 556.2 |
| Example 7 | 51.9 | 3.8 | 308 | 3.08 | 686.1 |
| Example 8 | — | — | — | 3.65* | 753.9 |
| Example 9 | 51.9 | 0.38 | 236 | 3.35 | 791.4 |

*= Gravimetric density of the shaked dry powder mixture

TABLE 2

| | Electrical characteristics | | | |
|---|---|---|---|---|
| | Specific capacity | | | |
| | I = 0,2 $C_5A$ | | I = $C_5A$ | |
| | (Ah/g) | (%) | (Ah/g) | (%) |
| Example 1 | 0.125 | 144.98 | 0.0498 | 108.83 |
| Example 2 | 0.125 | 144.98 | 0.075 | 163.9 |
| Example 3 | 0.0978 | 113.43 | 0.0442 | 96.59 |
| Example 4 | 0.097 | 112.5 | 0.037 | 80.86 |
| Example 5 | 0.099 | 114.82 | 0.0475 | 103.82 |
| Example 6 | 0.099 | 114.82 | 0.0456 | 99.65 |
| Example 7 | 0.1105 | 128.16 | 0.0531 | 116.04 |
| Example 8 | 0.086 | 100.00 | 0.04576 | 100.00 |
| Example 9 | 0.125 | 144.98 | 0.0498 | 108.83 |

It can be seen from the Tables that the gravimetric density of the active materials produced with the method according to the invention can be changed by the modification of the glyerine-PTFE-water rate. In connection with this the quantity of active material filled into the tubes with the same method, changes, and so does the porosity of the operating electrode. In the case of I=$C_5A$ loading current the active materials produced according to the invention, described in Examples 1, 2, 5, 7, 9, has the most advantageous electrical characteristics. In case of I=0,2 $C_5A$ loading current, the electrical characteristics of the active materials produced according to the invention, described in Examples 1, 2, 7, 9, are much better than the traditional active material (Example 8); and the characteristics of active material produced according to the invention described in Examples 5 and 6 are advantageous too.

The characteristics of the active materials produced by the method described in Examples 3 and 4 prove—in an indirect way, but unambigously—the synergetical effect of the addition containing glycerine-PTFE according to the invention, in a way that if these two ingredients are not present simultaneously, the porosity of the active material will be disadvantageous so that the electrical characteristics will be slight.

We claim:

1. A method for the production of a positive active material for lead storage batteries comprising PbO and $PbO_x$ powders in an optional ratio, x having a value between 1 and 2 and the metal lead content of the powders being not more than 35 weight percent, wherein an addition material comprising:

(a) glycerine in an amount of 25–125 g/kg of active material;

(b) polytetrafluorethylene in an amount of 0.05–10 g/kg of active material; and (c) water in an amount of 150–500 g/kg of active material;

is blended with the active material.

2. The method according to claim 1 characterized in that the volume of the addition material is 200–600 cm³/kg of active material.

3. The method according to claim 2 characterized in that the mixing is carried out at a temperature of 45° to 60° C.

4. The method according to claim 3 characterized in that the addition material is fed to the active material of lead powders in a continuous slow stream in the first to four fifths of the entire mixing time.

5. The method according to claim 1 characterized in that the active material and addition material are blended in a double Z-arm blender for 2 to 8 hours.

* * * * *